Figure 1:
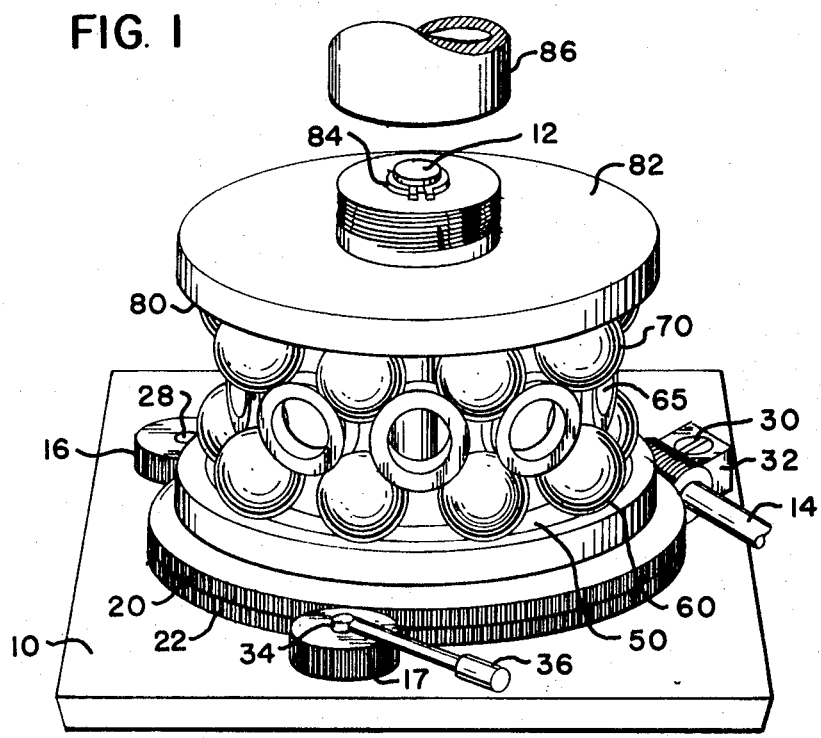

United States Patent [19]
Howland et al.

[11] 3,751,125
[45] Aug. 7, 1973

[54] KINEMATIC THRUST BEARING WITH BALLS AND ROLLERS

[76] Inventors: Bradford Howland, Rm. 20-C-007, RLE-M.I.T., Cambridge, Mass. 02139; Howard C. Howland, 205 Winston Drive, Ithaca, N.Y. 14850

[22] Filed: July 12, 1971

[21] Appl. No.: 161,854

[52] U.S. Cl. .............................................. 308/206
[51] Int. Cl. ........................................... F16c 33/00
[58] Field of Search ........................... 308/203, 206

[56] References Cited
UNITED STATES PATENTS

| | | | |
|---|---|---|---|
| 490,859 | 1/1893 | Pardon et al. | 308/206 |
| 1,119,034 | 12/1914 | Parker | 308/206 |

Primary Examiner—Charles J. Myhre
Assistant Examiner—Frank Susko
Attorney—Jack Larsen

[57] ABSTRACT

A novel thrust bearing is disclosed in which rotation is accompanied by a minimum of axial motion by reason of the averaging of defects over the various elements making up the bearing. A first race is partially filled with about two-thirds of a full complement of balls, the number of balls being odd. These balls are spaced apart by an equal odd number of grooved rollers which are held up out of contact with the race by the balls. A second row of balls each engaging two of the rollers and an upper race complete the novel structure. The construction has no resistance to radial displacement or tilting and must be used in combination with radial bearings. The construction with an even number of rollers is unstable. The construction is shown for the introduction of controlled and very small amounts of cyclic irregularities by tilting of one race.

10 Claims, 2 Drawing Figures

PATENTED AUG 7 1973　　　　　　　3,751,125

Bradford Howland
Howard C. Howland
INVENTORS.

BY Jack Larsen

ATTORNEY

KINEMATIC THRUST BEARING WITH BALLS AND ROLLERS

This invention relates to bearings and particularly to a novel thrust bearing in which rollers and balls work together to provide a bearing wherein the forces between elements are self-equalizing; that is, the device is kinematic.

The prior art is replete with examples of bearings in which balls or rollers are employed as spacers between load-bearing balls. German patent 205,106 to Fischer, British patents 27,268 of 1897 to Philippe and 18,383 of 1893 to Broadbent et al; and U.S. Pat. No. 366,117 to Lake are examples of this kind of bearing.

U.S. Pat. No. 3,423,142 to Wietrzykowski, No. 943,570 to Schluss, and 665,653 to Faller and German patent 174,448 (1904) to Hofert, are examples of bearing in which rolling elements either balls or rollers, space apart other rolling elements and are also load-bearing. These bearings are to be distinguished from the present invention primarily in that they are radial bearings in structure, which may have greater or lesser capacity for bearing axial loads, and by the fact that many of these patented designs are impractical in that the configuration of rolling elements shown in the drawings is unstable in that it is subject to spontaneous rearrangement and collapse. Surprisingly the general structure of the present invention is likewise unstable if its construction is attempted with an even number of elements, but is stable if assembled of an odd number of elements.

In one test of the invention an upper plate having a circular race about 2.2 inches in diameter on its lower face was fastened to a ¼ inch shaft at the center of the race and extending downward. To this shaft a lower plate was journalled with appropriate radial ball bearings. The upper face of the lower plate also had a race 2.2 inches in diameter facing the upper race. A conventional ball thrust bearing would be formed by inserting a row of balls between these races; and the novel bearing of this invention performs substantially the function of such a convention bearing. If in a conventional ball thrust bearing, the balls were perfectly hard, and perfectly round, and if the races were perfectly true and perfectly hard, and if foreign bodies would forever be excluded from between the elements, and if the selected means for keeping the balls apart were likewise perfect, there would be no need for the present invention. It is, therefore, an object of the present invention to reduce by averaging out, the effect of localized imperfections in balls, races, and retaining and separating means, and the effect of small foreign bodies in such a bearing.

The construction by which this object is attained is characterized by the inclusion of additional layers of rolling elements. Continuing with the above example, the races would accommodate a full complement of 24 balls of ¼ inch diameter. According to the invention, only 17 balls are placed on the lower race. Then to separate these balls, 17 rollers each with a toroidal groove on its outer surface and about five-sixteenths inch in diameter are positioned on the balls on the lower race, the groove of each roller engaging two successive balls on the lower race. In this example the rollers were defunct inner races from conventional radial ball bearings which were canabalized for the purpose. Holding these in place temporarily (with adhesive tape, for example), a second set of 17 balls is placed each to engage the grooves of successive rollers, then the upper race is applied. It is noted that while a load may be applied to the upper race along the axis of the bearing, it does not resist tipping, and is relatively "soft" and compliant as to motion of the upper race parallel to the lower race. The thrust bearing so constructed must be supplemented by other structure to restrict tipping and radial motion.

If the construction had been attempted starting with either 16 or 18 balls, the assembly could be made, and a load applied; but with the first start of motion one roller would tend to ride up between a pair of balls, the next roller would tend to drop down, and so on around the ring with resulting complete collapse. With an odd number of rings, this form of progressive failure one way around is cancelled by an opposite progression the other way, so that constructions with an odd number of rollers are stable, while those with an even number of rollers are unstable.

With this construction, if one ball is out-of-round, the effect of this out-of-roundness is not communicated directly to the opposing race, but only through the intervention of all of the other balls and rollers by the action of which it tends to be averaged out.

This arrangement also tends to reduce the effect of tilt in one of the main races, and warpage of a race. If the axis of the bearing makes an angle A with the perpendicular to the plane of the first race, and makes an angle B with the perpendicular to the plane of the first race, then as one race rotates relative to the other around the axis, the distance between the planes of the races measured along the axis varies according to the equation:

$$d = k_0 + k_1 AB \cos \theta + k_2 \sin(2\theta + P_2) + \ldots k_n \sin(n\theta + P_n) \qquad 1$$

where $k_0, k_1, k_2 \ldots k_n$ are constants, $\theta$ is the output angle measured from the point of maximum error. Ordinarily only $k_0$ and $k_1$ are significant, and since the error contribution from the first order term is proportional to the product of two ordinarily small angles, this term also is small. It is also controllable. Thus if A is fixed and very small, B may be adjusted in amount and phase to introduce into a system a very small sinusoidal compensation. It is, therefore, also an object of the invention to provide means for providing small compensatory motions in mechanical systems.

It is a further feature of the invention to provide a ball bearing in which all contacts may be rolling contacts and in which the ball assembly is kept tight by the thrust load without backlash; and it is a further object of the invention to provide such anti-backlash feature; but it is not suggested that this feature is better provided by this new construction than by the above-mentioned prior-art constructions specifically and primarily directed to this feature.

Figure 2:
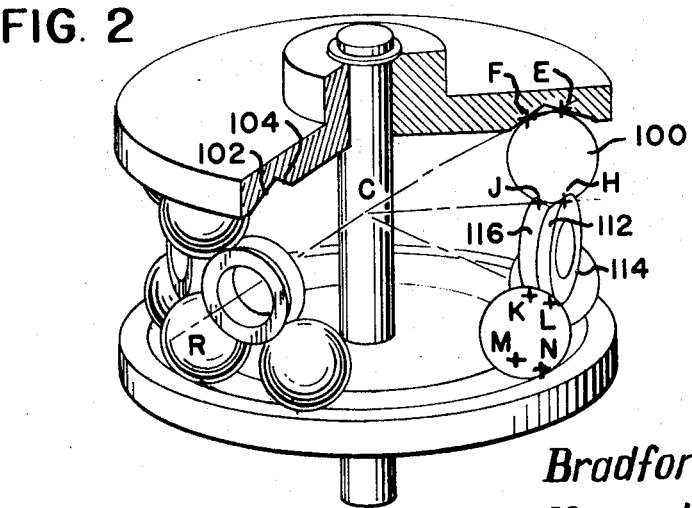

Other objects and features of the invention will in part be obvious and in part be apprehended from the following description taken in conjunction with the annexed drawings of which:

FIG. 1. is a perspective drawing of the preferred embodiment of the invention and FIG. 2 is a broken away view of an alternative embodiment of the invention.

Referring now to FIG. 1: The bearing assembly is carried on a base 10 from which the shaft 12 extends upwardly nominally perpendicular, the top of which is ground flat. Carried on a worm block 32 on the base 10 is a worm gear 14 with its axis parallel to the ground surface of the base, and a pair of small spur idler gears 16 and 17 with their axes generally perpendicular to the surface of the base. Engaging the worm 14, and the idler gears 16 and 17 at substantially equal intervals around their circumferences are two thin, worm gear wheels 20 and 22, which in the preferred embodiment are three inches in diameter and have respectively 359 and 362 teeth. Thus the teeth of the two worm gears are in substantial alignment at only three points on their circumferences where they engage the worm 14 and the two idlers 16 & 17. The stub shaft 28 on which one of the idlers 16 rotates is ground eccentrically so that the axis of the idler 16 does not coincide with the hole in the base 10 in which it is inserted. This allows a very fine adjustment, which in coaction with similar eccentricity in the mounting bolt 30 for the worm block 32 permits the worm wheel 20 to be adjusted in perfect concentricity with the shaft 12. The idler stub shaft 34 which carries the idler 17 has a handle 36 pinned to its end and is bushed into the base 10 with an eccentricity of about one-sixteenth of an inch so that when the handle 36 is turned one-quarter turn, the worm wheels 20 and 22 are released.

The lower ball race 50 of the bearing is ground into the upper surface of the wheel 20. The bottom of the wheel 20 is ground flat with a small wedge angle such as ½° of arc between the bottom and the effective plane of the race 50. Similarly both top and bottom of the wheel 22 are ground flat with a similar small dihedral angle between them. Thus with wheel 20 on top of wheel 22, rotation of one relative to the other will effect a tilt of the race relative to the base in magnitude between 0° and 1°. Rotating both wheels together changes the azimuth of that tilt.

Since the number 359 of teeth on wheel 20 has no common factor with the number 362 of teeth on wheel 22, it required 362 × 359 = 129,958 turns to exhaust the possibilities of magnitude and direction of tilt to be introduced into the lower race. In practice the approximately 21,660 turns to rotate one wheel 180° with respect to the other will provide precision commensurate with practical apparatus.

In the embodiment of FIG. 1, the lower race is a vee race with two lines of contact with the balls. The outer conical surface of the vee is less steeply inclined to the horizontal than the inner conical surface and carries most of the load. The lines of contact on the balls form two circles with circumferences which are proportional to the circumferences of the corresponding lines of contact on the races, so rolling contact is maintained, and precession of balls is a second-order effect. There are nine balls 60 in the lower race 50 and nine rings 65 which serve as rollers. These rings are reground inner races from a radial ball bearing and their outer surfaces are a circular toroidal shape closely matching the curvature of the balls. The least principal radius of curvature of the race surface is only about 5% greater than the radius of the balls, and a wear track is noted somewhat outside of the centerline of the rollers. The upper set of nine balls 70 in this case are of the same diameter as the lower set, and the upper race 80 is of the same size and shape as the lower race and is ground in the bottom surface of the end piece 82. The lower hub of the piece 82 contains a radial bearing (not shown) which engages the shaft 12 to center the hub of the piece 82 relative to the shaft. The shaft extends through the hub, and is retained by a clip 84 which holds the bearing together when the thrust load is removed. The upper hub is threaded on its outer diameter to engage internal threads on shaft enlarged portion, 86 at the end of a precision lead screw shaft 88. A second radial bearing (not shown) at the other end of the lead screw redundantly maintains the radial stability of the thrust bearing axis.

The end piece 82 is first assembled to the lead screw and the screw fitting stabilized with a set screw before the race 80 is ground and this race and the seat for the radial bearing are ground concentric and perpendicular to the axis of the precision lead screw. The end piece is then removed from the lead screw and the thrust bearing is assembled. The piece may again be assembled to the lead screw in a reproducable way, the threads having an interference fit that is tightened only to the point marked by the set screw or set screws.

FIG. 2 is representative of a bearing in which balls contact each race at two points, that is, each ball has six points of contact, two with each of two rollers and two with the top or bottom race as the case may be. To maintain true rolling contact at all points of contact the bearing may be designed so that all of the rolling elements roll around axes that form appropriate predetermined angles with the output axis of the bearing. A solution is that all of these axes intersect the output axis of the bearing at the same point C. Since this is a symmetrical configuration with upper and lower races of the same diameter, that point is midway between the planes of the upper and lower races, so that the rollers roll about horizontal axes, pointed inward, as for example CR. The design is reached by a succession of trials, which may be worked out graphically on drawings of a vertical section through the center of a ball, which contains the contact points of the balls and the upper and lower races, and a slant section containing the axes about which one of the rollers and two of the adjacent balls roll, which contains the points of contact between balls and rollers. It is necessary that if the point E represents the point of contact between the ball 100 and the upper race outer conical surface 102, then the point F which is the point of contact between the ball 100 and the inner conical surface 104 shall lie on the line CE.

In like manner it is necessary that if the point H is the point of contact between the ball 100 and conical surface 112 which is the outer race surface of the roller 114, then the point J which is the point of contact between the ball 100 and the conical surface 116, must lie on the line CH. In like manner the point of contact K and L must lie on a straight line through C and points of contact M and N must also define a line through C.

In an alternate similar configuration, all race grooves are of substantially the same circular cross section, having a least principal radius of curvature only a few percent greater than the radius of the balls.

Although it is preferred that the effective diameters of balls and rollers be about equal, and in the given examples, the balls were all of one size, this is not necessary, nor is it necessary that the upper and lower races have the same diameter, or that the upper row of balls should be of the same diameter as the lower row of balls. It is possible for the upper row of balls to be less than half the diameter of the lower row, in which case the upper race has a substantially smaller diameter than the lower race and the rollers necessarily lean inward and their axes of rotation are inclined relative to the races. In such a construction the groove in the rollers would be contoured to engage the smaller balls in contact rings which lie between the points of contact for the larger balls which define the rings of contract for those balls.

The foregoing description of an embodiment of the invention being by way of illustration only, the scope of the invention is defined by the following claims.

We claim:

1. An axial antifriction bearing comprising three series of rolling parts, between a first circular ball race open in a first axial direction and lying in a plane perpendicular to that direction, and a second circular ball race substantially coaxial to, and parallel to, said first race and facing it open in the opposite axial direction, wherein the first series of parts is an odd number, greater than one, of balls engaging said first race, said second series of parts is an equal odd number of balls engaging said second race, and said third series of parts is an equal odd number of rollers each of said rollers being supported by four of said balls, two balls from said first series and two balls from said second series, by the contact of said four balls with a circular groove around the outer surface of said roller.

2. An axial antifriction bearing as defined by claim one wherein said races and said groove are circularly toroidal in form.

3. An axial antifriction bearing as defined by claim one wherein one of said races is circularly toroidal in form.

4. An axial antifriction bearing as defined by claim one wherein said groove comprises a circularly toroidal surface for contacting at least two of said four balls.

5. An axial antifriction bearing as defined by claim 4 wherein said groove comprises a pair of conical surfaces for contacting the pair of said four balls not in contact with said toroidal surface.

6. A bearing as defined by claim one in further combination with means for connecting said first race to a base, means for connecting said second race to other apparatus, and radial bearing means to constrain said first and second races to relative rotation about their common axis.

7. A bearing as defined by claim one in further combination with means for adjusting the tilt of one of said races relative to said first axial direction in amount and in direction.

8. A bearing as defined by claim one wherein each of said balls is supported at six points of contact, said six points of contact defining three lines for each of said balls, a first line defined by the pair of points of contact with one of said races, a second line defined by the pair of points of contact with one of said rollers, and the third line defined by the pair of points of contact with another of said rollers, all of said lines converging on a point on the axis of said races.

9. A bearing as defined by claim one wherein the points of contact between said balls and said races and rollers describe on the surfaces of said balls, rollers, and races, a plurality of circles, each of said circles defining a line normal to its plane and through its center, wherein all of said lines are designed to converge at a point, and substantially so converge.

10. A bearing as defined by claim one wherein the points of contact between said balls and said races and rollers describe on the surfaces of said balls, rollers, and races, a plurality of tracks which are substantially circles, each of said circles defining a line normal to its plane and through its center wherein all of said lines converge to a center, substantially a point.

* * * * *